June 2, 1964

R. A. LEIGHTNER 3,135,875

RING COUNTER EMPLOYING FOUR-LAYER DIODES AND SCALING RESISTORS TO EFFECT COUNTING

Filed May 4, 1961

2 Sheets-Sheet 1

INVENTOR
ROBERT A. LEIGHTNER

BY Bernard N. Wiener

ATTORNEY

June 2, 1964 R. A. LEIGHTNER 3,135,875

RING COUNTER EMPLOYING FOUR-LAYER DIODES AND SCALING RESISTORS TO EFFECT COUNTING

Filed May 4, 1961 2 Sheets-Sheet 2

United States Patent Office 3,135,875
Patented June 2, 1964

3,135,875

RING COUNTER EMPLOYING FOUR-LAYER DIODES AND SCALING RESISTORS TO EFFECT COUNTING

Robert A. Leightner, Tioga Center, N.Y., assignor to International Business Machines Corporation, New York, N.Y., a corporation of New York Filed May 4, 1961, Ser. No. 107,729
1 Claim. (Cl. 307—88.5)

This invention relates to ring counters and more particularly to a ring counter in which each stage thereof has a first and second stable condition and in which one stage is in the first condition and each other stage is in the second condition after each input pulse.

A ring counter provides an indication of the order of a particular pulse in a train of input pulses operationally applied thereto. The counter has a plurality of stages each of which can be established in either one of its stable conditions. A ring counter is particularized by an interconnection between its nominal last stage and its nominal first stage such that the first stage is an adjacent stage relative to the last stage. One stage is in the first or lone condition and all other stages are in the second condition before each input pulse is applied to the ring counter. An input pulse is adapted to cause the stage in the lone condition to change to its second condition and an adjacent stage to adopt the state of the preceding stage and become the stage of the counter in the lone condition. The order of the particular input pulse in the train of input pulses which causes the ring counter to change its count is indicated by a manifestation of the lone condition of the stage which registers the input pulse.

The prior art includes ring counters which have a unitary bistable element with a first and second stable state as a switching device in each stage. Each prior stage is connected to the electrically succeeding stage in such a fashion that the polarity of the manifestation of the lone condition of the prior stage and of the succeeding stage is inverse. The inversion of polarity of the manifestation of an input pulse in adjacent stages has required a special inversion network for alternate stages in order that the order of any particular input pulse be uniformly indicated by the ring counter. A particular prior art ring counter of the above-noted type is disclosed on page 447 of the text "Digital Computer Components and Circuits" by R. K. Richards, D. Van Nostrand Company, Inc., 1957.

It is a prime object of this invention to provide a ring counter having a unitary bistable element as a switching device in each stage thereof and in which the polarity of the manifestation of the lone condition of each stage is the same.

It is another object of this invention to provide a ring counter having a unitary bistable element as the switching device in each stage thereof in which the polarity of the manifestation of the lone condition of each stage is the same and in which there is an indication of the order of the last input pulse applied to the counter either as added to or subtracted from the number of the pulses in the train of pulses which have operated the counter.

The foregoing and other objects, features and advantages of the invention will be apparent from the following more particular description of two preferred embodiments of the invention, as illustrated in the accompanying drawings.

Figure 3:
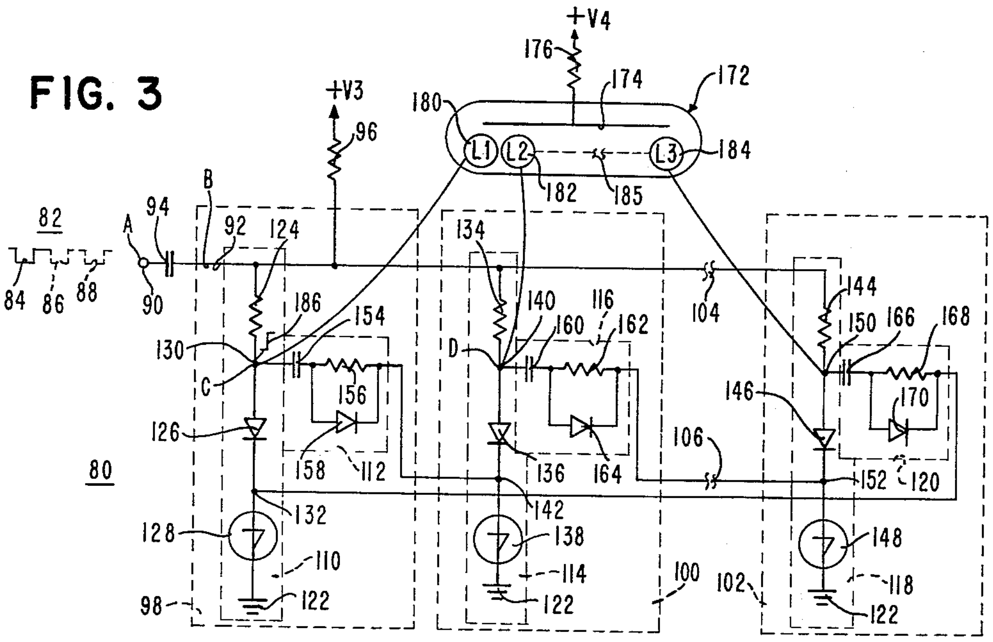
FIGURE 3 illustrates a preferred embodiment of the ring counter of this invention showing the circuit connections to obtain uniform manifestation of the lone condition of each stage.

Generally, the ring counter in accordance with this invention has a unitary bistable element as the switching device in each stage thereof. Bias means connected to each stage establishes one stage in the lone condition and each other stage in a second condition. Lone condition transfer means connected to each stage causes the lone condition to transfer from a prior stage to an adjacent stage for each input pulse with uniform manifestation.

More particularly, the ring counter in accordance with this invention has a plurality of parallel stages capable of being established in either a lone condition or a second condition. One stage is established in its lone condition and each other stage is established in its second condition for each input pulse. In each stage there is a unitary bistable element as the switching device for switching the lone condition and second condition thereof. Each input pulse in a train of input pulses applied to the ring counter is manifested uniformly by the respective stage which switches from the second condition to the lone condition. A voltage means establishes the total quiescent current of the ring counter as slightly greater than the critical holding current of the unitary bistable element in each stage. Each input pulse is applied to the ring counter in a manner that the operating voltage across the parallel path is changed sufficiently to cause the lone condition to be shifted to an electrically adjacent stage of the ring counter. There is a coupling means between each stage whereby the lone condition is transferred from the prior stage which manifesets it to an electrically adjacent stage.

A particular aspect of the ring counter in accordance with this invention involves a series path in each stage which includes a resistive impedance, a unilateral impedance, and a coupling network between electrically adjacent stages which network includes a series path having a coupling capacitor and a unilateral impedance.

Another particular aspect of the ring counter in accordance with this invention involves means for switching the second condition of either an electrically succeeding or an electrically preceding stage to its lone condition depending on whether an input pulse is to be added to or subtracted from the number of input pulses which have previously operated the ring counter.

A ring counter in accordance with this invention is well suited for use as part of the input-output and display equipment of a digital computer, for indicating information concerning certain pulses having a particular numerical weight. Numerical weight is defined as the arithmetic value assigned to a specific voltage pulse. The ring counter in accordance with this invention is particularly useful where it is desirable to obtain an indication of the total number of pulses of a particular numerical weight at a given terminal. Through use of the addition and subtraction feature of the invention described with reference to the preferred embodiment shown in FIG. 5, an indication of the total number of pulses both positive and negative numerical weights is readily obtained.

Figure 1:
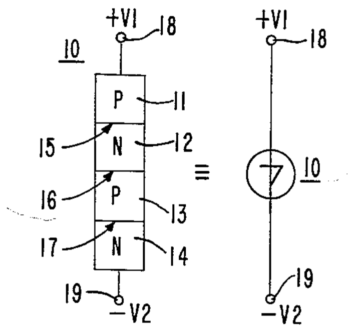
FIGURE 1 illustrates the symbol for and nature of a four-layer diode utilized in the preferred embodiments of this invention disclosed herein.

FIG. 1 illustrates the symbol for the four-layer transistor diode utilized as the bistable switching element in each stage of the preferred embodiments of this invention described herein. The p-n-p-n four-layer diode 10 has a p-type region 11, an n-type region 12, a p-type region 13, and an n-type region 14 with respective p-n, n-p and p-n transistor diode junctions 15, 16 and 17. Four-layer diode 10 has a positive voltage terminal 18 connected to p-type region 11 and positive voltage source +V1; and it has a negative voltage terminal 19 connected to n-type region 14 and negative voltage source −V2. The nature of, and operating parameters for a four-layer diode suitable for the practice of this invention are described in U.S. Patent No. 2,912,598, issued November 10, 1959, to W. Shockley.

Figure 2:
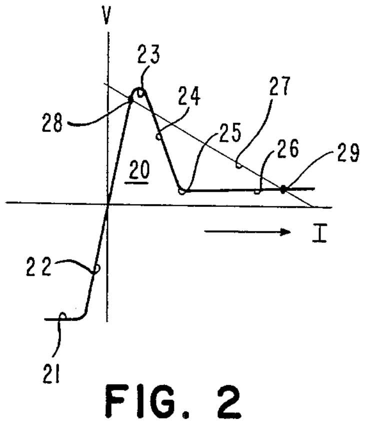
FIGURE 2 is an illustrative voltage versus current curve for the four-layer diode indicating the two-stable operating points thereof.

FIG. 2 illustrates the voltage versus current curve of a four-layer diode. The vertical and horizontal axes are voltage V and current I, respectively. Voltage versus current curve 20 has essentially horizontal region 21 in the third quadrant; essentially straight region 22 in the third and first quadrant which passes through the origin. The curve 20 has peak point 23 in the first quadrant which is at the four-layer diode 10 firing voltage. Negative region 24 joins peak point 23 to valley point 26 which is the critical or minimum permissible current which will hold the four-layer diode 10 in the high current state. A slightly rising region 26 extends to the right of valley point 25. Illustrative load-line 27, four-layer diode 10 establishes operating points 28 and 29. Operating point 28 is at relatively high voltage and low current and four-layer diode 10 is termed "Off." Operating point 28 is at relatively high voltage and low current and four-layer diode 10 is termed "Off." Operating point 29 is at relatively low voltage and high current and four-layer diode 10 is termed "On."

A first preferred embodiment of the ring counter in accordance with this invention is illustrated by the ring counter 80 of FIG. 3. Input pulse train 82 of negative going input pulses 84, 86 and 88 is applied to input terminal 90. Input terminal 90 is connected to common input pulse line 92 via input capacitance 94. Common input pulse line 92 is connected via resistance 96 to positive voltage source +V3. Ring counter 80 comprises networks 98, 100 and 102. In the practice of this invention, network 102 is merely the last of many networks as indicated by the broken conductor points 104 and 106. Ring counter network 98 includes stage 110 and coupling network 112; ring counter network 100 includes stage 114 and coupling network 116; and ring counter network 102 includes stage 118 and coupling network 120. Stage 110 is connected to the common input pulse line 92 and ground 122 and comprises a series path of resistance 124, conventional diode 126 and four-layer diode 128.

Resistance 124 is connected to conventional diode 126 by junction 130 and conventional diode 126 is connected to four-layer diode 128 at junction 132. Stage 114 is connected between common input pulse input line 92 and ground 122 and comprises a series path of resistor 134, conventional diode 136 and four-layer diode 138 connected, respectively, at junctions 140 and 142. Stage 118 is connected to the common input pulse line 92 and ground 122 and comprises resistor 144, conventional diode 146 and four-layer diode 148 connected, respectively, at junctions 150 and 152. Coupling network 112 connects junction 130 of stage 110 to junction 142 of stage 114; coupling network 116 connects junction 140 of stage 114 to junction 152 of stage 118; and coupling network 120 connects junction 150 of stage 144 to junction 132 of stage 110. Coupling network 112 comprises coupling capacitor 154 in series with the parallel arrangement of resistor 156 and conventional diode 158; coupling network 116 comprises capacitor 160 in series with the parallel arrangement of resistance 162 and conventional diode 164; and coupling network 120 comprises coupling capacitor 166 in series with the parallel arrangement of resistance 168 and conventional diode 170.

Gas numerical indicator tube 172 has anode 174 connected via resistor 176 to positive voltage source +V4. The cathodes 180, 182 and 184 of indicator lamp 172 are connected, respectively, to junction 130 of stage 110, junction 140 of stage 114, and junction 150 of stage 118. Indicator tube 172 has lamps L1, L2 and L3 associated with cathodes 180, 182 and 184, respectively. Actually, there are as many lamps in indicator lamp 172 as counter networks in the ring counter 80, as indicated by the broken point 185. In a conventional indicator tube suitable for the practice of this invention, a numeral at each cathode evidences visually the particular stage in the lone condition.

The operation of ring counter 80 will be understood through consideration of the transfer of stored information therein from stage to stage assuming as the initial condition that stage 110 is in its high current condition and stages 114 and 118 are in their low current condition. The voltage supply +V3 via resistor 96 limits the total current to the identical stages 98, 100 and 102 to a value greater but less than twice the valley current of any one of the four-layer diodes 128, 138 and 148. The resistance 124, 134 and 144, respectively, establishes the minimum current through its stages 110, 114 and 118 at greater than the valley current of the four-layer diode 128, 138 and 148 therein. The current to all the stages and in each stage is limited as noted above so that only one four-layer diode in the ring counter 80 can be conducting at a particular moment.

Input pulse 84 causes the voltage on line 92 to fall thereby reducing the current through the four-layer diode 128 to below its critical current causing it to switch to its low current state. While four-layer diode 128 is conducting, the current therein flows through the series path including it and resistance 124 and conventional diode 126. Since current has ceased to flow through resistance 124 as a result of four-layer diode 128 switching to its low current state, the potential at junction 130 becomes essentially the same as on common input pulse line 92. A positive voltage step 186 appears at junction 130. The positive voltage step 186 is coupled by coupling network 112 to junction 142 of stage 114. Stage 114 was assumed for the initial condition to be in its low current state. Hence, positive voltage step 186 raises the potential at junction 142 to a point which exceeds the peak or firing voltage of four-layer diode 138 and it switches to its high current state. The resistance 156 in parallel with diode 158 discharges the negative charge which accumulates on capacitance 154 when the positive voltage step 186 is transferred to junction 142. As each input pulse of the train 82 is applied to input terminal 90, the high current state is transferred to each succeeding stage of the ring counter 80.

When stage 110 is in its high current condition, the voltage at output terminal 130 is negative relative to the voltage at output terminals 140 and 150. Thus, the potential between the cathode 180 and anode 174 of indicator tube 172 is greatest and lamp L1 lights up indicating that stage 110 is in its high current condition. As the high current condition, i.e., lone condition, is transferred from stage to stage, the respective lamp of indicator tube 172 lights up.

By conventionally connecting output terminal 150 of stage 118 to a second ring counter, not shown, identical to ring counter 80, a register of the total pulses received at input terminal 90 is available. The number of cascaded ring counters is determined by the total number of pulses it is desired to register.

Ring counter 80 is readily adapted to have a reset feature, not shown. For example, if it is desired to reset it so that initially stage 110 is in the high current condition and stages 114 and 118 are in the low current condition, the lower terminals of four-layer diodes 138 and 148 are connected to a common junction. The common junction is connected to ground via a parallel arrangement of a normally closed shorting switch and a resistance. Assume stage 114 is in its high current condition when the shorting switch is operated to its open position. The voltage drop across the added resistance which is due to the flow of the stage 114 current therethrough causes four-layer diode 138 to switch to its low current state and prevents four-layer diode 148 from switching to its high current state. As the ring counter 80 circuit parameters are such that one stage thereof is always in its high current condition during quiescent operation, stage 110 switches to its high current condition.

Figure 4:
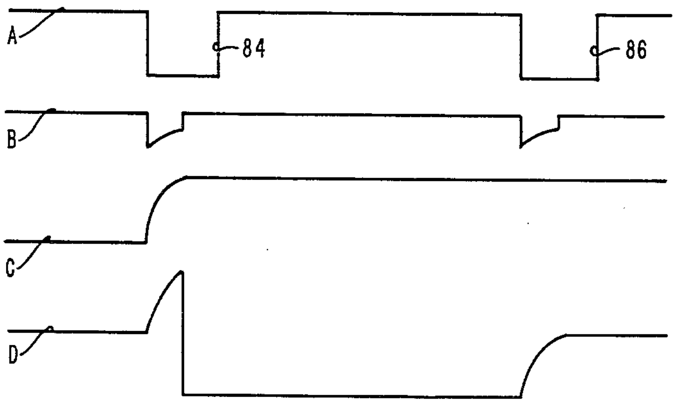
FIGURE 4 is a timing diagram which shows the voltage waveform at particular points in the embodiments of FIGURE 3.

FIG. 4 is a timing chart for the embodiment of this invention shown in FIG. 4 illustrating voltage levels at certain points therein. Curve A indicates the plurality of sequential pulses which are applied to input terminal 90. Curve B indicates the voltage pulses which appear on conductor 92. Curve C indicates the voltage which appears at junction 130. Curve D indicates the voltage which appears at junction 140. It is noted that curve D stays down until the second input pulse 86 appears at the input terminal 90, at which time the four-layer diode 138 switches to its low current state.

Figure 5:
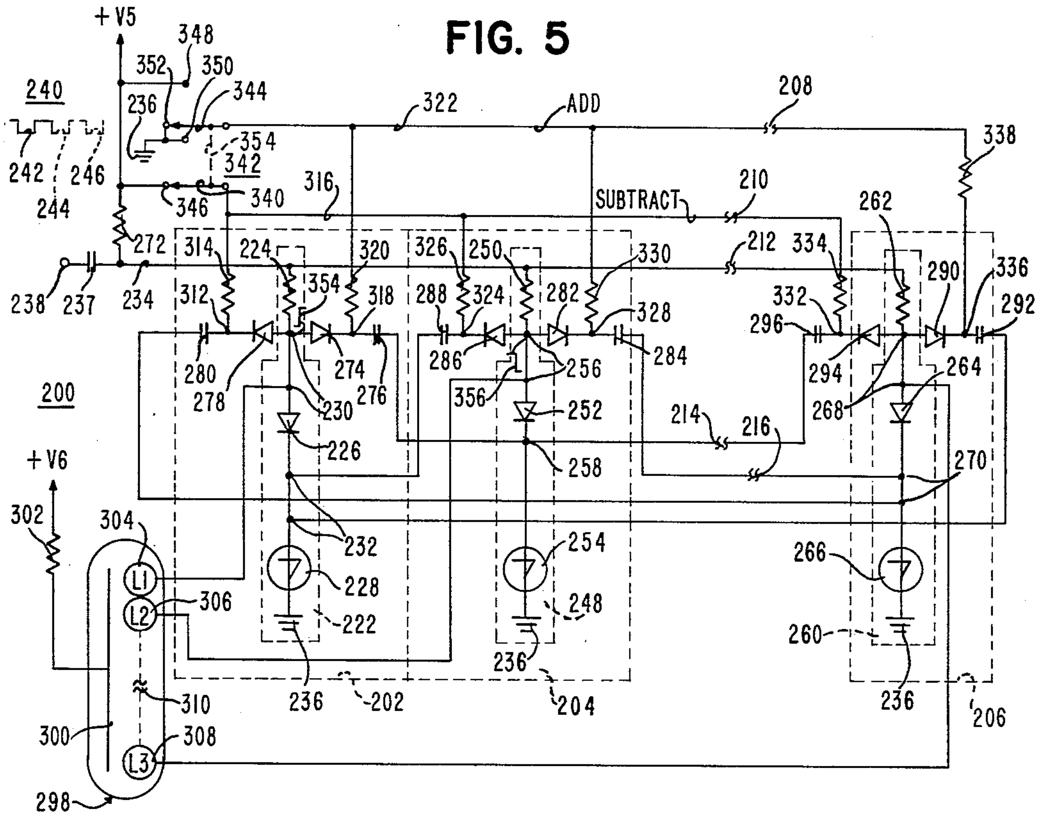
FIGURE 5 illustrates another preferred embodiment of the ring counter of this invention showing the circuit connections to obtain uniform manifestation of the lone condition of each stage and the sum or difference of the last input pulse applied to the counter relative to the number of pulses which have operated the counter.

FIG. 5 illustrates a second preferred embodiment of this invention which has the capability of adding or subtracting an input pulse to the precedent pulses of a train of input pulses and providing an indication thereof. The ring counter 200 of FIG. 5 has a plurality of counter networks 202, 204 and 206. The ring counter 200 can have any particular number of counter networks, which is indicated by the broken line points 208, 210, 212, 214 and 216. Counter network 202 includes bistable stage 222 having a series path of resistance 224, conventional diode 226 and four-layer diode 228 connected at junction 230 and 232, respectively. Bistable switching stage 222 is connected between common input pulse line 234 and ground 236. Common input pulse line 234 is coupled via input capacitor 237 to input terminal 238. Input pulse train 240 having input pulses 242, 244 and 246 is applied to input pulse terminal 238. Common input pulse line 234 is also connected via resistor 272 to positive voltage source +V5.

Counter network 204 includes bistable switching stage 248 having a series path of resistance 250, conventional diode 252 and four-layer diode 254 connected, respectively, by junctions 256 and 258. Bistable switching stage 248 is connected between common input pulse line 234 and ground 236. Similarly, counter network 206 includes bistable switching stage 236 having a series path of resistance 262, conventional diode 264, and four-layer diode 266 connected respectively at junctions 268 and 270. Bistable switching stage 260 is connected betwen counter input pulse line 234 and ground 236.

Junction 230 of bistable switching stage 222 is connected via series path of conventional diode 274 and coupling capacitor 276 to junction 258 of bistable switching stage 248 and via series path of conventional diode 278 and capacitor 280 to junction 270 of counter stage 260. Further, junction 256 of bistable switching stage 248 is connected via series path of conventional diode 282 and coupling capacitor 284 to junction 270 of bistable switching stage 260 and via series path of conventional diode 286 and coupling capacitor 288 to junction 232 of bistable switching stage 222. Also, junction 268 of bistable switching stage 260 is connected via conventional diode 290 and coupling capacitor 292 to junction 232 and via conventional diode 294 and coupling capacitor 296 to junction 258 of bistable switching stage 248.

Gas numerical indicator tube 298 has anode 300 connected via resistor 302 to positive voltage source +V6. Indicator lamp 298 has cathodes 304, 306 and 308. Between cathodes 306 and 308 there is a breakpoint 310 to indicate that there are as many cathodes as there are counter networks in the ring counter 200. Cathode 304 has indicator lamp L1 associated therewith, cathode 306 has indicator lamp L2 associated therewith, and cathode 308 has indicator lamp L3 associated therewith. In a conventional indicator tube suitable for the practice of this invention, a numeral at each cathode evidences visually the particular stage in the lone condition. Cathode 304 of indicator tube 298 is connected to junction 230 of bistable switching stage 222; cathode 306 is connected to junction 256 of bistable switching stage 248, and cathode 308 is connected to junction 268 of bistable switching stage 260. Junction 312 between conventional diode 278 and coupling capacitor 280 is connected via resistor 314 to common subtract voltage line 316. Junction 318 between conventional diode 274 and coupling capacitor 276 is connected via resistance 320 to common add voltage line 322. Further, junction 324 between conventional diode 286 and coupling capacitor 288 is connected via resistor 326 to common subtract voltage line 316; and junction 328 between conventional diode 382 and coupling capacitor 284 is connected via resistor 330 to common add voltage line 322. Also, junction 332 between conventional diode 294 and coupling capacitor 296 is connected via resistor 334 to common subtract voltage line 316; and junction 336 between conventional diode 290 and coupling capacitor 292 is connected via resistor 338 to common add voltage line 322.

Common subtract voltage 316 is connected to switch terminal arm 340 of switch 342 and common add voltage line 322 is connected to switch terminal 344 thereof. Terminal arms 340 and 344 are mechanically connected by connector 354 so that they open and close their respective contacts simultaneously. Terminals 346 and 348 of switch 342 are connected to positive voltage source +V5 and terminals 350 and 352 thereof are connected to ground 236. Switch terminal arm 340 communicates with terminals 346 and 350 while switch terminal arm 344 communicates with terminals 352 and 348, respectively. Although switch 342 has been described and illustrated as mechanical in nature, it can readily be replaced conventionally by an electronic switch whenever the speed thereof is a requirement for practice of the invention.

The voltage supply +V5 and resistance 272 are selected so that the voltage on common input pulse line 234 is such that the total current flowing in bistable switching stages 222, 248 and 260 is slightly less than twice the critical holding current for the four-layer diodes 228, 254 and 266. The resistances 224, 250 and 262 are selected so that in conjunction with resistance 272, the current in each of the bistable switching stages is permissibly slightly larger than the critical current of the four-layer diode therein.

When switch 342 is placed in the add position, the voltage +V5 is applied to junctions 312, 324 and 332 via resistances 314, 326 and 334, respectively. When it is placed in the subtract position, these junctions are connected to ground potential. Junctions 318, 328 and 336 are connected to potential +V5 via resistances 320, 330 and 338, respectively, when switch 342 is in the subtract position and are connected to ground potential when it is in the add position. The function of the voltages applied at each of the noted junctions is to steer the signal which appears thereat when its bistable switching element changes state to the appropriate adjacent stage. The basic operation of each stage 222, 248 and 260 is similar to the operation of the stages of ring counter 80 (FIG. 3) when an input pulse is applied to the ring counter 200.

The operation of ring counter 200 will be described under the circumstance that stage 222 is in its high current condition and stages 248 and 260 are in their low current conditions. Four-layer diode 228 is in its high current state (point 29 of FIG. 2) and four-layer diodes 254 and 266 are in their low current states (point 28 of FIG. 2). Switch 342 is set in the add position, i.e., terminal arm 344 is connected to ground 236 and terminal arm 340 is connected to voltage source +V5. Junction 312 between conventional diode 278 and coupling capacitor 280 of network 202 is at potential +V5 and junction 318 between conventional diode 274 and coupling capacitor 276 of network 202 at ground potential. Since stage 222 is in its high current state, junction 230 is back-biased and conventional diode 274 is forward biased. When input pulse 242 is coupled to common input pulse line 234, it causes stage 222 to switch to its low current condition, i.e., four-layer diode 228 switches to its low current state. A positive going voltage step 354 appears at junction 230, and is coupled via conventional diode 274 and coupling capacitor 276 to junction 258 of stage 248. This causes stage 248 to switch to its high current condition when the four-layer diode 254 therein switches to its high current state. The negative voltage step 356 produced at junction 256 of stage 248 is transmitted to junction 270 of stage 260 but stage 260 is already in its low current condition and the negative voltage step 356 does not alter it.

Ring counter 200 has a similar coupling network in both the forward and backward directions. Therefore, its operation when switch 342 is placed in the subtract position is similar to its operation discussed for the forward direction when switch 342 is placed in the add position. The operation of indicator 298 is comparable to the operation of indicator 172 of ring counter 80 of FIG. 4.

Ring counter 200 is readily adapted to have a reset feature, not shown. For example, if it is desired to reset it so that initially stage 222 is in the high current condition and stages 248 and 260 are in the low current condition, the lower terminals of four-layer diodes 254 and 266 are connected to a common junction. The common junction is connected to ground via a parallel arrangement of a normally closed shorting switch and a resistance. Assume stage 248 is in its high current condition when the shorting switch is operated to its open position. The voltage drop across the added resistance which is due to the flow of the stage 248 current therethrough causes four-layer diode 254 to switch to its low current state and prevents four-layer diode 266 from switching to its high current state. As the ring counter 80 circuit parameters are such that one stage thereof is always in its high current condition during quiescent operation, stage 222 switches to its high current condition.

In summary, through the practice of this invention a ring counter is provided which is preferable over the prior art, e.g., (*a*) inversion networks are not required for alternate stages in order to obtain uniform manifestation of an input pulse, and (*b*) the number of components is minimized.

While the invention has been particularly shown and described with reference to preferred embodiments thereof, it will be understood by those skilled in the art that the foregoing and other changes in form and details may be made therein without departing from the spirit and scope of the invention.

What is claimed is:

An electric signal actuatable counter, comprising:

a plurality of individual identical stages capable of residing in either of two possible electrical states, each of said stages including, a four-element semiconducting device settable to either of two discrete electric current passing conditions, one terminal of which serves as an output, and an input circuit relating said device to said actuating electric signals;

a bias voltage connected to the inputs of each stage of such value as to set the respective devices to a certain of the current passing conditions;

interconnection means relating the output of each stage to another stage whereby successive application of the electric signals effects a chainlike transfer of one of said current passing conditions from stage to stage while maintaining the other stage in the other condition;

selectively actuatable means interrelating the bias voltage and each of the stages for biasing the four-element devices of said stages simultaneously to either of two possible discrete states of potential whereby successive application of electric signals to the counter effects precession of said one current passing condition in a first path of stages when one of said potential states exists and in a second path of stages when said other potential state exists; and in which said selectively actuatable means comprises, a first series circuit for each stage including a first scaling resistance and a first diode, a second series circuit for each stage including a second scaling resistance and a second diode, said second resistance having a value different from that of said first resistance, one end of said first and second series circuits connected to the input circuit for said four-element device, and selectively operable switching means relating the other ends of said first and second series circuits and said bias voltage for biasing said devices to either of their two possible potential states.

References Cited in the file of this patent

UNITED STATES PATENTS

| | | |
|---|---|---|
| 2,614,141 | Edson et al. | Oct. 14, 1952 |
| 2,646,534 | Manley | July 21, 1953 |
| 2,841,705 | Moerman | July 1, 1958 |
| 2,855,524 | Shockley | Oct. 7, 1958 |
| 3,065,360 | Vallese | Nov. 20, 1962 |

OTHER REFERENCES

Electronic Industries and Tele-Tech, August 1957, pp. 60–61, "The Four-Layer Diode," by Shockley.

IBM Technical Disclosure Bulletin, vol. 1, No. 6, April 1959, pp. 27–30, "Non-Linear Diode Logical Circuits," by Thomas.

IRE Wescon Convention Record, Part 3, Electron Devices, August 18–21, 1959.

Strauss: Wave Generation & Shaping (1960), McGraw-Hill Book Co., Inc., page 316.